United States Patent
Lu et al.

(10) Patent No.: US 12,125,178 B2
(45) Date of Patent: Oct. 22, 2024

(54) IMAGE DEFOGGING METHOD BASED ON SIMULATED POLARIZATION FOGGY SCENE DATA SET

(71) Applicant: Beihang University, Beijing (CN)

(72) Inventors: Feng Lu, Beijing (CN); Sijia Wen, Beijing (CN)

(73) Assignee: Beihang University, Beijing (CN)

( * ) Notice: Subject to any disclaimer, the term of this patent is extended or adjusted under 35 U.S.C. 154(b) by 305 days.

(21) Appl. No.: 17/566,849

(22) Filed: Dec. 31, 2021

(65) Prior Publication Data

US 2022/0222785 A1 Jul. 14, 2022

(30) Foreign Application Priority Data

Jan. 11, 2021 (CN) .......................... 202110034043.1

(51) Int. Cl.
*G06T 5/73* (2024.01)
*G06N 3/08* (2023.01)
*G06T 5/50* (2006.01)

(52) U.S. Cl.
CPC .................. *G06T 5/73* (2024.01); *G06T 5/50* (2013.01); *G06N 3/08* (2013.01); *G06T 2207/10024* (2013.01); *G06T 2207/20084* (2013.01); *G06T 2207/30192* (2013.01)

(58) Field of Classification Search
CPC ... G06T 5/73; G06T 5/50; G06T 2207/10024; G06T 2207/20084; G06N 3/08
See application file for complete search history.

(56) References Cited

FOREIGN PATENT DOCUMENTS

CN 111539888 A * 8/2020 ........... G06N 3/0454

* cited by examiner

*Primary Examiner* — Bobbak Safaipour
*Assistant Examiner* — Ashley L. Hytrek (57) ABSTRACT

The embodiments of the present disclosure disclose image defogging method. A specific mode of carrying out the method includes the steps to: obtain a polarized fog-free scene image set, generate a first quintuple based on each polarized fog-free scene image, and obtain a first quintuple set; extract pixel coordinates meeting a preset condition from the significant polarization image included in each first quintuple, to obtain a pixel coordinate group to generate a second quintuple; generate a simulated polarization foggy scene image sequence based on each second quintuple, to obtain a simulated polarization foggy scene data set; design a polarization state attention neural network; obtain a polarized foggy scene image, and input the polarized foggy scene image into the polarization state attention neural network to obtain a polarized defogging image. This embodiment can still improve the accuracy of image defogging with poor lighting conditions.

4 Claims, 5 Drawing Sheets

IMAGE DEFOGGING METHOD BASED ON SIMULATED POLARIZATION FOGGY SCENE DATA SET

CROSS-REFERENCE TO RELATED APPLICATION

The present application is based on, and claims priority from, Chinese application number CN202110034043.1, filed Jan. 11, 2021, the disclosure of which is hereby incorporated by reference herein in its entirety.

TECHNICAL FIELD

The embodiments of the present disclosure relate to the field of computer vision and image processing, and in particular, to an image defogging method.

BACKGROUND

Images collected under bad weather conditions are often affected by fog. Since light will be disturbed by particles in the air, the quality of captured images tends to degrade significantly, such as poor contrast, unrealistic color fidelity, and loss of scene details. This degradation of image quality is a common obstacle for a wide range of computer vision tasks, for example, urban traffic monitoring, outdoor video surveillance, autonomous driving, and other computer vision tasks. Therefore, defogging is needed to improve the quality of the images collected under bad weather conditions.

Figure 1:
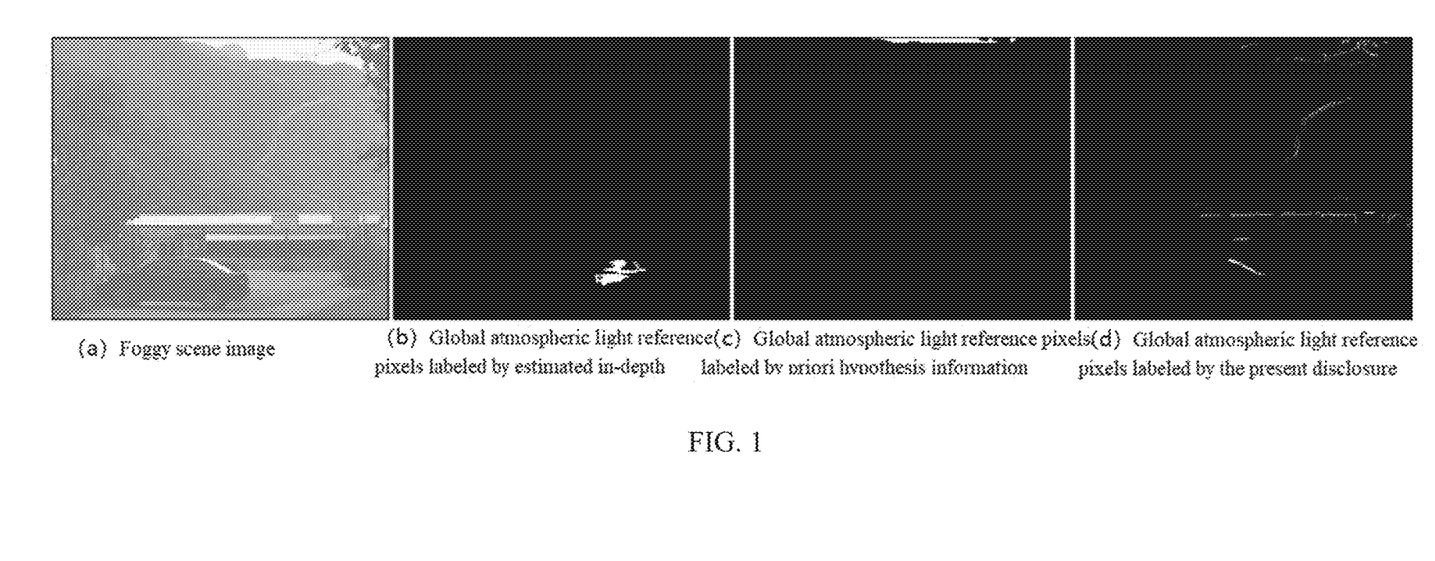
FIG. 1 is an application scene diagram of the labeled global atmospheric light reference pixel of the present disclosure.

Traditional color-based or polarization-based defogging algorithms usually introduce priori knowledge or make some hypotheses about the calculation of global atmospheric light. Such priori and hypotheses may lead to erroneous defogging results in some cases, resulting in reduced image quality after defogging, and even color deviation. In addition, these methods may amplify the noise of image during the defogging process, causing the defogging result to have large areas of noise. As shown in FIG. 1, the reference pixels labeled by the present disclosure for calculating the global atmospheric light achieve a more reasonable labeling result than the estimated in-depth information and priori hypothesis information.

With the development of deep learning technology, more and more methods try to train a neural network to get better image defogging effects. Such deep learning methods usually rely on data sets with true values. At the present stage, there is no sensor suitable for long-distance deep collection. Therefore, this type of data-driven method is often trained on a synthetic data set (such as the RESIDE data set), wherein the RESIDE data set is a foggy day image data set. By performing in-depth estimation on the collected scene images, this data set synthesizes the corresponding simulation data by selecting appropriate scattering coefficients. However, the estimated in-depth information is always rough and inaccurate, which makes the synthesized foggy scene image visually unreal and physically unreliable. Therefore, such neural networks as trained on the data set synthesized by estimating depth cannot be well extended into real scenes. Considering the complexity and uncertainty of the imaging process of foggy scenes, image defogging is still a very challenging task.

SUMMARY

The content of the present disclosure is to introduce concepts in a brief form, and these concepts will be described in detail in the following section of the detailed description. The content of the present disclosure is not intended to identify the key features or essential features of the claimed technical solution, nor is it intended to limit the scope of the claimed technical solution.

Taking into account the fact that there is no deep measuring sensor that can be applied to long-distance scenes at the present stage, and the light passing through the fog in a foggy scene is partially polarized light, the present disclosure proposes the use of polarization and color to sharpen and defog the polarized color image and the foggy scene image in a deep learning environment. The present disclosure observes that using polarization information can more accurately estimate the global atmospheric light value, which can significantly improve the authenticity of the synthesized data and the accuracy in the physical sense. Previous methods usually estimate the in-depth information of the scene image inaccurately. The present disclosure is different. It directly collects polarized color images and proposes a simulation method for polarized foggy scenes to construct a data set with true values. Based on the analysis of the polarization information of the polarized color image, a simulation strategy of using polarization information to simulate foggy scene images is proposed. Thanks to the physical sense of polarization, it can be expected that the deep neural network trained on the simulated polarization foggy scene data set can be well extended into real foggy scene images. Polarization information includes a total intensity image, a significant polarization image, a polarization angle image and a lightest foggy image.

On the basis of the simulated polarization foggy scene data set, the present disclosure proposes an end-to-end PSANet (Polarization state attention network), focusing on solving the two problems of polarization feature extraction and image defogging based on polarization information. Based on the attention mechanism in deep learning, the present disclosure proposes a polarization feature extraction module, which can effectively and accurately extract polarization features of foggy scene images. After obtaining the polarization feature, the present disclosure proposes a polarization defogging module, which uses a polarization transmission model and a polarization defogging model in combination to sharpen and defog the foggy scene image.

The above embodiments of the present disclosure have the following beneficial effects: a foggy scene image simulation strategy is proposed, thereby constructing a polarized foggy scene data set. Different from the method of estimating the in-depth information of a rough scene, the polarization information of the scene image can be accurately collected, so the foggy scene image simulated by the present disclosure will not destroy the physical constraints in the scene image. Based on the polarization defogging model, the polarization transmission model and the proposed data set, the present disclosure brings forward an end-to-end convolutional neural network focusing on the polarization state. This network uses a polarization feature extraction module and a polarization defogging module to realize the sharpening and defogging of the polarized color foggy scene image based on the polarization feature. The solution proposed by the present disclosure advances and improves the existing method. Besides, the fog-free image recovered by the present disclosure still retains relatively accurate polarization information, which not only enables the result of defogging to have an effect of high-definition visually, but the recovered polarization information also provides the scene image with a physical property that is difficult to detect by conventional imaging.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant disclosure are shown in the drawings. In the case of no conflict, the embodiments in the present disclosure and the features in the embodiments can be combined with each other.

It should be noted that such adjuncts as "one" and "more" mentioned in the present disclosure are illustrative, but not restrictive, and those skilled in the art should understand that, unless the context clearly indicates otherwise, they should be understood as "one or more".

The following is a detailed description of the present disclosure with reference to the drawings and in conjunction with embodiments.

Figure 2:
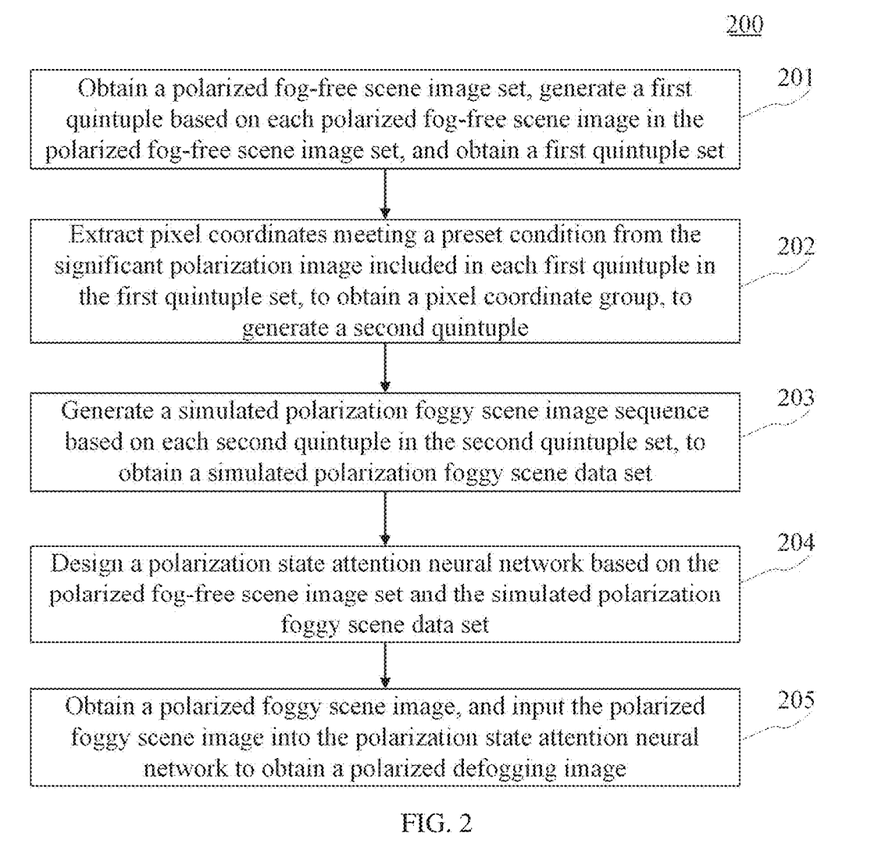
FIG. 2 is a flowchart of some embodiments of an image defogging method according to the present disclosure.

Referring to FIG. 2, there is shown a process 200 of some embodiments of the image defogging method according to the present disclosure. The image defogging method includes the following steps:

Step 201: Obtain a polarized fog-free scene image set, generate a first quintuple based on each polarized fog-free scene image in the polarized fog-free scene image set, and obtain a first quintuple set.

In some embodiments, the executive body of the image defogging method based on the simulated polarization foggy scene data set may obtain a polarized fog-free scene image set through a wired or a wireless connection. Wherein, the above polarized fog-free scene image may be obtained by a polarized color sensor sampling in a clear and fog-free weather. Based on each polarized fog-free scene image in the polarized fog-free scene image set, the polarization-related technology can be used to generate a first quintuple to obtain a first quintuple set.

In certain optional implementations of some embodiments, the first quintuple above is obtained through the following steps:

The first step: collect a polarized fog-free scene image set by a polarized color sensor.

As an example, the polarized color sensor may be a single-chip polarized color sensor widely used in the market.

The second step: use the following formula to obtain a total intensity image and an amplitude value based on each polarized fog-free scene image in the polarized fog-free scene image set:

$$I(\phi_1) = \frac{S_0}{2} + \alpha\cos 2(\phi_1 - \psi)$$

$$I(\phi_2) = \frac{S_0}{2} + \alpha\cos 2(\phi_2 - \psi)$$

$$I(\phi_3) = \frac{S_0}{2} + \alpha\cos 2(\phi_3 - \psi)$$

$$I(\phi_4) = \frac{S_0}{2} + \alpha\cos 2(\phi_4 - \psi).$$

Wherein, $\phi_1$ represents the preset first polarization angle; $\phi_2$ represents the preset second polarization angle; $\phi_3$ represents the preset third polarization angle; $\phi_4$ represents the preset fourth polarization angle; I represents the polarized fog-free scene image; $I(\phi_1)$ represents the image collected by the sensor when the polarization angle is $\phi_1$; $I(\phi_2)$ represents the image collected by the sensor when the polarization angle is $\phi_2$; $I(\phi_3)$ represents the image collected by the sensor when the polarization angle is $\phi_3$; $I(\phi_4)$ represents the image collected by the sensor when the polarization angle is $\phi_4$; $S_0$ represents the total intensity image; a represents the amplitude value; and $\psi$ represents the azimuth angle of incident light. The preset first polarization angle may be 0°. The preset second polarization angle may be 45°. The preset third polarization angle may be 90°. The preset fourth polarization angle may be 135°.

Because the polarized color sensor can collect images at four different polarization angles (0°, 45°, 90°, 135°) at a time, and the above formula has three unknowns: the total intensity image, the amplitude value and the incident light azimuth angle. Substituting the collected image data and polarization angle therein can obtain the total intensity image and amplitude value. Use the above to obtain them.

The third step: based on the total intensity image and the amplitude value, use the following formula to obtain a significant polarization image, a polarization angle image, and a lightest foggy image:

$$\begin{cases} SP = 2\alpha \\ DoLP = \frac{2\alpha}{S_0} \\ I_{min} = \frac{S_0}{2} - \alpha. \end{cases}$$

Wherein, $\alpha$ represents the amplitude value; $S_0$ represents the total intensity image; SP represents the significant polarization image; DoLP represents the polarization angle image; and $I_{min}$ represents the lightest foggy image.

The fourth step: generate a first quintuple based on the polarized fog-free scene image, the total intensity image, the significant polarization image, the polarization angle image and the amplitude value. In some embodiments, it is possible that the polarized fog-free scene image, the total intensity image, the significant polarization image, the polarization angle image and the amplitude value form one quintuple, as the first quintuple.

Step 202: Extract pixel coordinates meeting a preset condition from the significant polarization image included in each first quintuple in the first quintuple set, to obtain a pixel coordinate group to generate a second quintuple.

In some embodiments, for each pixel in the significant polarization image included in one first quintuple, the above executive body calculates the arithmetic average of the values of this pixel in all the color channels. Therefore, each pixel in the significant polarization image corresponds to a value. The "pixel coordinates" mentioned in the present disclosure are all identified by establishing an image coordinate system for related images in the following way: the origin is the upper left corner of the image, the unit is pixel, the number of columns of pixels in the image array is the abscissa, and the number of rows of pixels is the ordinate, thus establishing the image coordinate system. Therefore, each pixel coordinate in the significant polarization image corresponds to a value. The preset condition can be the values in the set of the first m maximum values among all these values. Therefore, each significant polarization image corresponds to a pixel coordinate group, that is, each first quintuple corresponds to a pixel coordinate group. The polarized fog-free scene image, total intensity image, significant polarization image and polarization angle image in the first quintuple and the pixel coordinate group corresponding to the first quintuple form a quintuple, as the second quintuple.

As an example, m can be [0.5%], wherein, H represents the rounding function. The top 0.5% pixels of the total number of pixels with the strongest polarization are selected as the reference pixels for calculating the global atmospheric light. Because the polarization of the pixels in this area per se is very strong, the fog has very little effect on the polarization of the area, so it can be used as the reference pixel to calculate the global atmospheric light of the scene image.

Step 203: Generate a simulated polarization foggy scene image sequence based on each second quintuple in the second quintuple set, and combine it to obtain a simulated polarization foggy scene data set.

In some embodiments, the above executive body may generate a simulated polarization foggy scene image sequence based on each second quintuple in the second quintuple set. After that, each simulated polarization foggy scene image in the generated respective simulated polarization foggy scene image sequence is used as the element to construct a simulated polarization foggy scene image set, and this image set is used as a simulated polarization foggy scene data set.

In certain optional implementations of some embodiments, the above executive body may combine the following steps to obtain the simulated polarization foggy scene data set:

The first step: for each second quintuple in the second quintuple set, use the following formula to generate a transmission map:

$$T(x) = 1 - \frac{SP}{Di \times Ai}.$$

wherein, x represents the pixel coordinate group, T(x) represents the transmission map, SP represents the significant polarization image, Di represents a polarization angle value of the global atmospheric light, and Ai represents a pixel intensity value of the global atmospheric light. The calculation method of Di is the average value of the corresponding pixel value group in the polarization angle image, of the pixel coordinate group. The calculation method of Ai is the average value of the corresponding pixel value group in the total intensity image, of the pixel coordinate group.

The above formula is a polarization transmission model, through which the transmission map of each polarized foggy scene image can be obtained.

The second step: use the following formula on the basis of the transmission map to generate a simulated polarization foggy scene image sequence:

$$S = C \cdot \delta^{lnT(x)} + As \cdot (1 - \delta^{lnT(x)}),$$

wherein, S represents the simulated polarization foggy scene image, C represents the polarized fog-free scene image, T(x) represents the transmission map, $\delta$ represents the atmospheric scattering coefficient; and As represents the global atmospheric light coefficient. By changing the atmospheric scattering coefficient and the global atmospheric light coefficient, for a polarized fog-free scene image C, multiple simulated polarization foggy scene images can be generated, that is, the simulated polarization foggy scene image sequences.

The third step: the polarized fog-free scene images included in each second quintuple in the second quintuple set all can obtain a simulated polarization foggy scene image sequence. Use all the simulated polarization foggy scene images in these image sequences as elements to construct a set, and use this set as a simulated polarization foggy scene data set.

Figure 5:
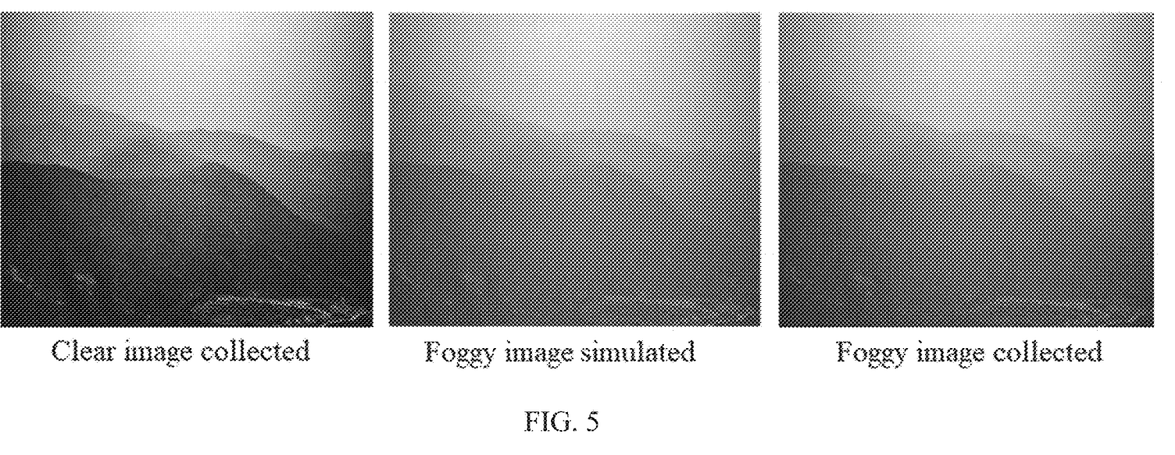
FIG. 5 is a schematic diagram comparing the simulated foggy image with the real foggy image of the present disclosure.

As an example, the simulated polarization foggy scene data set implemented by the present disclosure is composed of 10220 simulated foggy scene images and 40 really collected polarized foggy scene images for verification purposes. Wherein, the simulated polarization foggy scene image is generated from 292 collected polarized fog-free scene images. As shown in FIG. 5, the polarized foggy scene image obtained through simulation is visually very close to the real polarized foggy scene image collected.

Step 204: Design a polarization state attention neural network based on the polarized fog-free scene image set and the simulated polarization foggy scene data set.

In some embodiments, the above executive body may train the polarization state attention neural network through the simulated polarization foggy scene data set. Wherein, the polarization state attention neural network includes such three modules as a global atmospheric light extraction module, a polarization feature extraction module, and a polarization defogging module.

It can be seen from above that one polarized fog-free scene image can generate multiple simulated polarization fog-free scene images correspondingly. Each simulated polarization foggy scene image in the simulated polarization foggy scene data set, and the polarized fog-free scene image that generated said image, are made as data pairs, and these data pairs are used as the trained sample sets to perform supervised learning for the polarization state attention neural network, so that after inputting the simulated polarization foggy scene image into the network, the output image obtained is as close as possible to the polarized fog-free scene image in the trained sample, and the objective function can be constrained by the mean square error.

Through the simulated polarization foggy scene data set, the present disclosure first designs a global atmospheric light extraction module, and uses a spatial attention module to calculate the global atmospheric light feature of the input image. To be specific, the global atmospheric light extraction module has the input image entered into three convolutional layers respectively, each convolutional layer followed by an 8×8 global pooling layer. Two of the three variables after the three pooling layers undergo size changes respectively, then are subject to matrix multiplication, and the result of the multiplication is input into a Softmax layer. Wherein, the Softmax layer is a layer in the neural network constructed according to the Softmax logistic regression. Thereafter, the output result is matrix multiplied as a coefficient with the variable that does not undergo size change. In order to guarantee not to lose too much detail, the input image and the multiplication result are aligned and summed by layer-jumping connection. Then a convolutional layer, a convolutional pooling layer, a fully connected layer and a ReLU (Rectified Linear Units) layer are sequentially joined up to obtain the final global atmospheric light feature.

The polarization feature extraction module extracts the polarization feature of the input image. Wherein, the polarization feature includes the total intensity image feature, the significant polarization image feature, the polarization angle image feature, and the lightest foggy image feature. To be specific, the polarization feature extraction module first connects the input image to a convolutional layer, a residual layer, and several convolutional layers one by one to obtain an intermediate feature. In order to make sure that the polarization feature and the color information of the collected scene are not missing, the present disclosure splices the intermediate features at four polarization angles in the channel dimension, then joins up several convolution modules, wherein the convolution modules include a number of channel attention modules, layer-jumping connections, and convolutional layers, etc. In the end, a convolutional layer and an activation layer are joined up to obtain an output result, which is called the polarization fusion feature of the input image.

Inspired by the fact that the generation of the polarization fusion feature benefits from the attention mechanism, the polarization defogging module first uses a channel attention module and several convolutional layers to extract the desired total intensity image feature, significant polarization image feature, polarization angle image feature, and lightest foggy image feature respectively. Then, the above extracted significant polarization image feature is used as the input of the polarization transmission model, and at the same time, the total intensity image feature and the polarization angle image feature are respectively used as the input of the global atmospheric light extraction module to obtain the polarization angle value Di of the global atmospheric light and the pixel intensity value Ai of the global atmospheric light, so as to implement the calculation of the transmission map feature T. In the end, the polarization defogging model is used to achieve defogging. The calculation formula of the polarization defogging model is as follows:

$$R = \frac{I \cdot T - Ai \cdot (1 - T)}{T}.$$

Wherein, R represents the polarization defogging image; T represents the transmission map feature; Ai represents the pixel intensity value of the global atmospheric light; and I represents the input image.

In order to retain more image detail and reduce the influence of fog on the reconstructed image, we connect the result calculated by the defogging model to the lightest foggy image feature, by layer-jumping connection in the channel dimension, then send it into two convolutional layers, thereby obtaining the final defogging result.

Step 205: Obtain a polarized foggy scene image, and input the polarized foggy scene image into the polarization state attention neural network to obtain a polarized defogging image.

In some embodiments, the above executive body may obtain a polarized foggy scene image through a polarized color sensor. The polarized foggy scene image can be sampled and acquired by the polarized color sensor in foggy weather. Since the polarization state attention defogging network designed by the present disclosure does not limit the size of the input image, a polarized defogging image can be obtained by inputting a polarized color foggy image of any size into the network.

Figure 3:
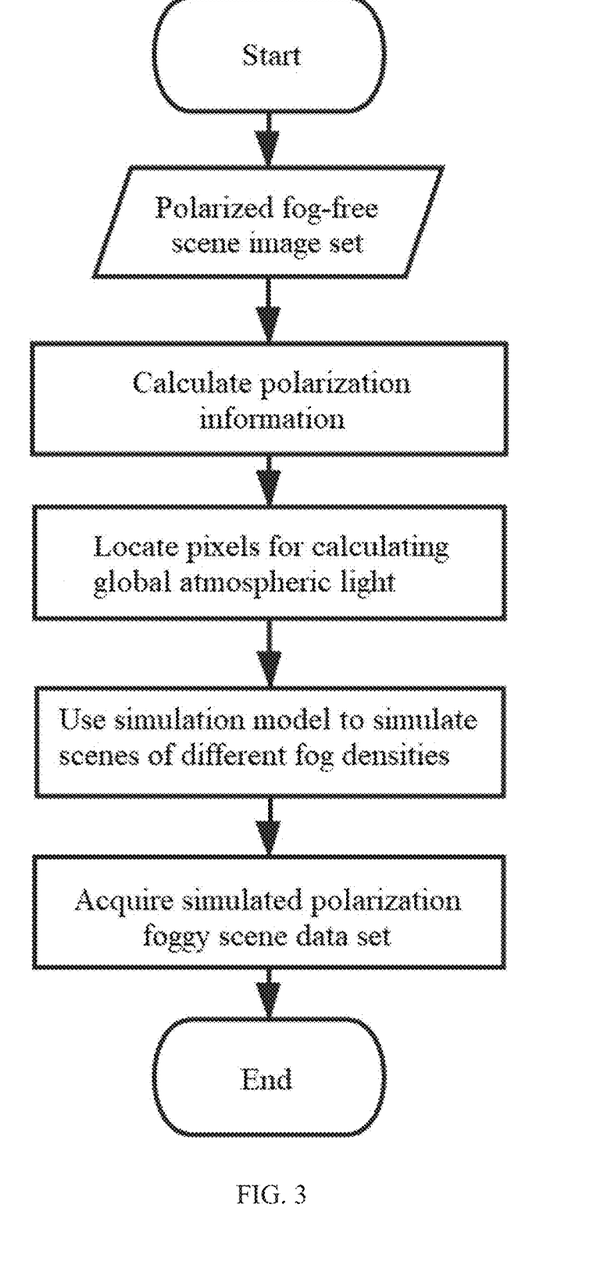
FIG. 3 is a flowchart for constructing a simulated polarization foggy scene data set of the present disclosure.

Referring now to FIG. 3, which shows a flowchart of constructing a simulated polarization foggy scene data set of the present disclosure.

The present disclosure first uses a polarized color sensor to collect polarized fog-free scene images. By calculating the significant polarization image, and using the reference pixels labeled by the significant polarization image to calculate the global atmospheric light value of the image, the present disclosure proposes a method of using polarization information to calculate the foggy scene image transmission map. By controlling different parameters, the simulation of polarized foggy scene data with different concentrations is realized, thereby constructing a simulated polarization foggy scene data set.

Figure 4:
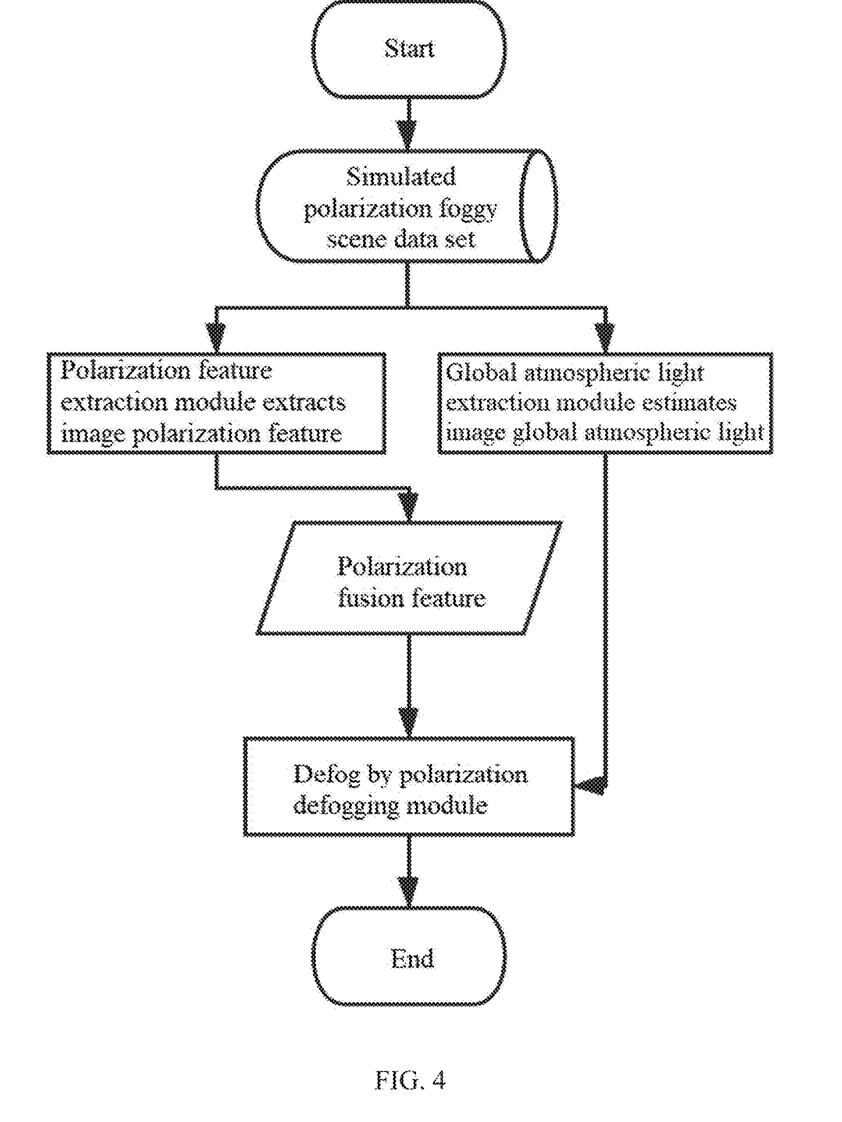
FIG. 4 is an image defogging flowchart of the present disclosure.

Now see FIG. 4, which shows a flowchart of image defogging of the present disclosure.

Through the simulated polarization foggy scene data set, the present disclosure first designs a polarization feature extraction module to extract the polarization feature of the inputted foggy image. In order to guarantee that the polarization feature and color information of the collected scene are not missing, the present disclosure fuses the polarization features of four polarization angles to obtain a polarization fusion feature. The polarization defogging module first uses a channel attention model to extract the required total intensity image feature, significant polarization image feature, polarization angle image feature, and lightest foggy image feature respectively. The global atmospheric light extraction module uses a spatial attention model to estimate the global atmospheric light feature of the input image. In the end, the features extracted above are used as input of the polarization defogging model, and the polarization defogging module combines this model into the convolutional neural network to achieve the ideal defogging result.

The above description is only some preferred embodiments of the present disclosure and an explanation of the applied technical principles. Those skilled in the art should understand that the scope of invention involved in the embodiments of the present disclosure is not limited to the technical solutions formed by the specific combination of the above technical features, but should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:

1. A method for image defogging applied to an image processor, the image processor being in communication with a memory configured to store computer executable instructions and being configured to execute the computer executable instructions to implement the method, the method comprising:
- receiving data including a polarized fog-free scene image set;
- generating a first quintuple based on each polarized fog-free scene image in the polarized fog-free scene image set, and obtaining a first quintuple set, wherein the first quintuple includes a polarized fog-free scene image, a total intensity image, a significant polarization image, a polarization angle image and an amplitude value;
- extracting pixel coordinates meeting a preset condition from the significant polarization image included in each first quintuple in the first quintuple set, to obtain a pixel coordinate group to generate a second quintuple, wherein the second quintuple includes a polarized fog-free scene image, a total intensity image, a significant polarization image, a polarization angle image and the pixel coordinate group;
- generating a simulated polarization foggy scene image sequence based on each second quintuple in the second quintuple set, combining the sequence to obtain a simulated polarization foggy scene data set;
- designing a polarization state attention neural network based on the polarized fog-free scene image set and the simulated polarization foggy scene data set; and
- obtaining a polarized foggy scene image, and inputting the polarized foggy scene image into the polarization state attention neural network to obtain a polarized defogging image.

2. The method of claim 1, wherein the receiving the data including the polarized fog-free scene image set includes:
- collecting the data of the polarized fog-free scene image set by a polarized color sensor; and
- the generating a first quintuple based on each polarized fog-free scene image in the polarized fog-free scene image set, includes:
- using the following formula to obtain an total intensity image and an amplitude value, based on each polarized fog-free scene image in the polarized fog-free scene image set:

$$\begin{cases} I(\phi_1) = \dfrac{S_0}{2} + \alpha\cos2(\phi_1 - \psi) \\ I(\phi_2) = \dfrac{S_0}{2} + \alpha\cos2(\phi_2 - \psi) \\ I(\phi_3) = \dfrac{S_0}{2} + \alpha\cos2(\phi_3 - \psi) \\ I(\phi_4) = \dfrac{S_0}{2} + \alpha\cos2(\phi_4 - \psi) \end{cases},$$

wherein, $\phi_1$ represents a preset first polarization angle, $\phi_2$ represents a preset second polarization angle, $\phi_3$ represents a preset third polarization angle, $\phi_4$ represents a preset fourth polarization angle, I represents the polarized fog-free scene image, $I(\phi_1)$ represents an image collected by the sensor when the polarization angle is $\phi_1$, $I(\phi_2)$ represents an image collected by the sensor when the polarization angle is $\phi_2$, $I(\phi_3)$ represents an image collected by the sensor when the polarization angle is $\phi_3$, $I(\phi_4)$ represents an image collected by the sensor when the polarization angle is $\phi_4$, $S_0$ represents the total intensity image, $\alpha$ represents the amplitude value, and $\psi$ represents an azimuth angle of incident light;

based on the total intensity image and the amplitude value, using the following formula to obtain a significant polarization image, a polarization angle image, and a lightest foggy image:

$$\begin{cases} SP = 2\alpha \\ DoLP = \dfrac{2\alpha}{S_0} \\ I_{min} = \dfrac{S_0}{2} - \alpha \end{cases},$$

wherein, $\alpha$ represents the amplitude value, $S_0'$ represents the total intensity image, SP represents the significant polarization image, DoLP represents the polarization angle image, and $I_{min}$ represents the lightest foggy image;

generating a first quintuple based on the polarized fog-free scene image, the total intensity image, the significant polarization image, the polarization angle image and the amplitude value.

3. The method of claim 2, wherein, the generating a simulated polarization foggy scene image sequence based on each second quintuple in the second quintuple set includes:
- based on each second quintuple in the second quintuple set, using the following formula to generate a transmission map:

$$T(x) = 1 - \dfrac{SP}{Di \times Ai},$$

wherein, x represents the pixel coordinate group, T(x) represents the transmission map, SP represents the significant polarization image, Di represents a polarization angle value of global atmospheric light, and Ai represents a pixel intensity value of the global atmospheric light;

using the following formula on the basis of the transmission map to generate the simulated polarization foggy scene image sequence:

$$S = C \cdot \delta^{ln\,T(x)} + As \cdot (1 - \delta^{ln\,T(x)}),$$

wherein, S represents the simulated polarization foggy scene image, C represents the polarized fog-free scene image, T(x) represents the transmission map, $\delta$ represents an atmospheric scattering coefficient, and As represents a global atmospheric light coefficient.

4. The method of claim 3, wherein, the polarization state attention neural network includes a global atmospheric light extraction module, a polarization feature extraction module, and a polarization defogging module.

* * * * *